July 21, 1964  W. F. LEE  3,141,525
EMERGENCY BRAKES FOR BICYCLES AND THE LIKE
Filed Sept. 24, 1962  2 Sheets-Sheet 1
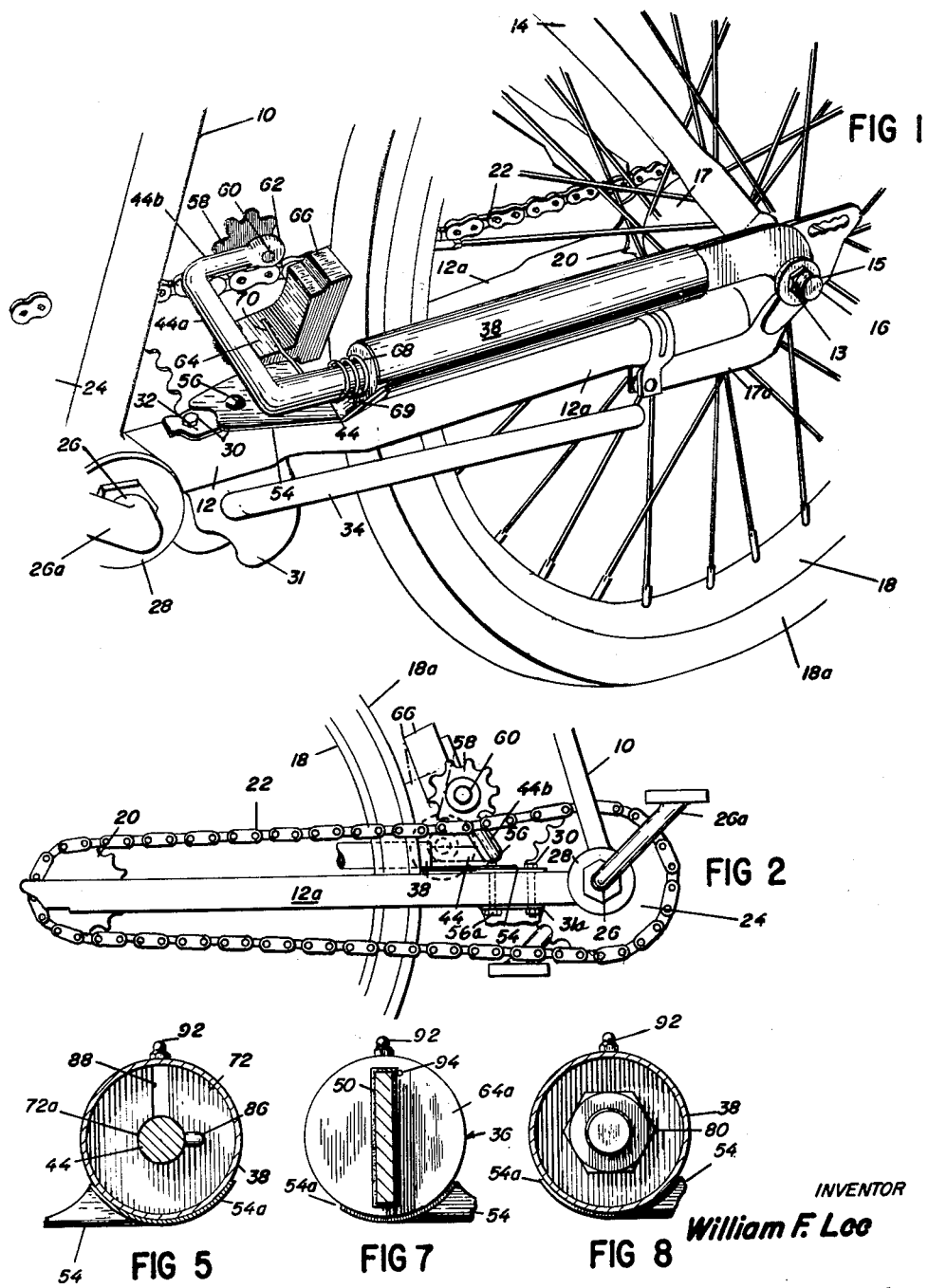
INVENTOR
William F. Lee
by Eugene E. Stevens
and
Raymond H. Stevens
Attorneys July 21, 1964 W. F. LEE 3,141,525
EMERGENCY BRAKES FOR BICYCLES AND THE LIKE
Filed Sept. 24, 1962 2 Sheets-Sheet 2
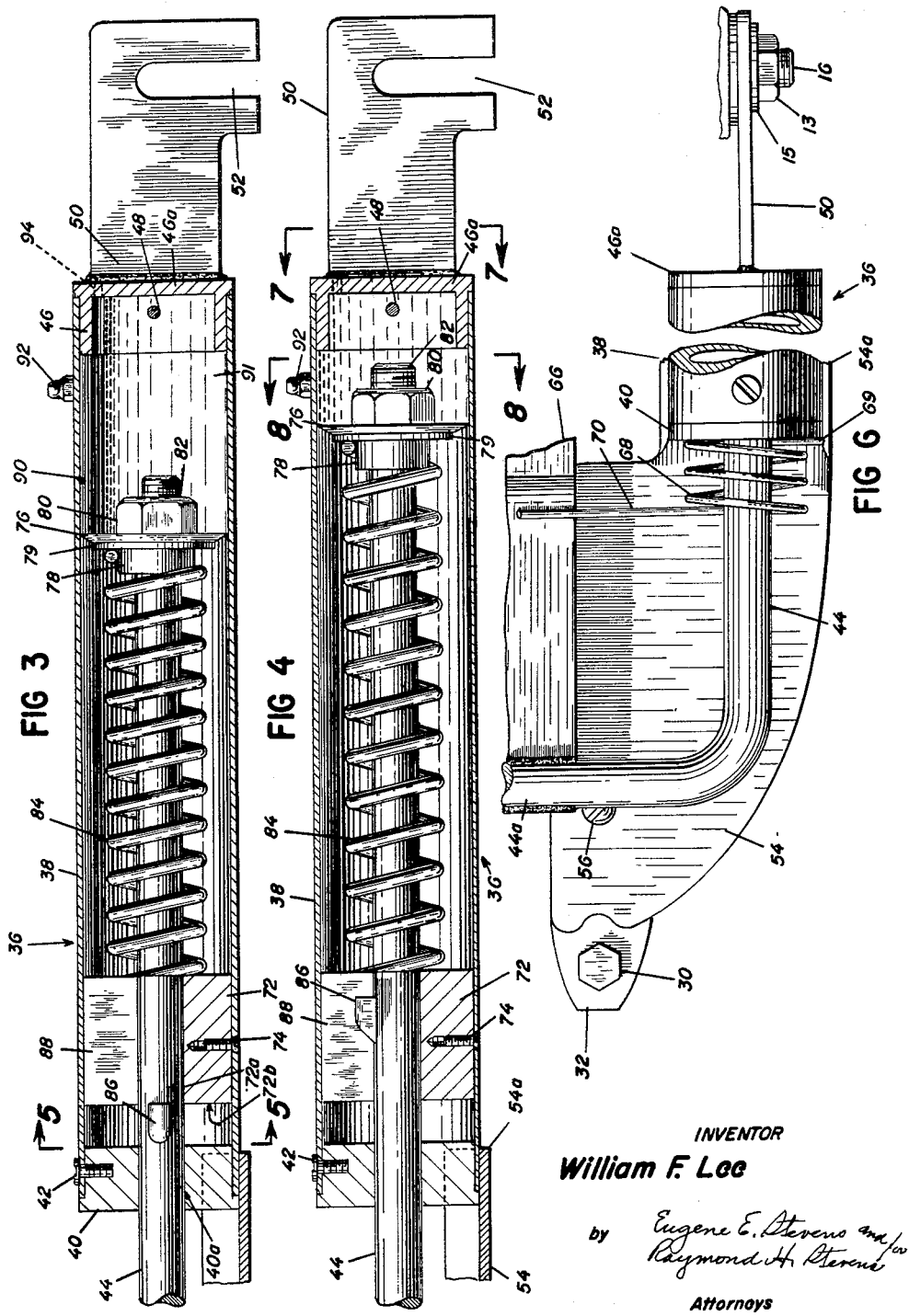
INVENTOR
William F. Lee
by Eugene E. Stevens and
Raymond H. Stevens
Attorneys

United States Patent Office 3,141,525
Patented July 21, 1964

3,141,525
EMERGENCY BRAKES FOR BICYCLES
AND THE LIKE
William F. Lee, 404 Howard Aden Apts.,
Spartanburg, S.C.
Filed Sept. 24, 1962, Ser. No. 225,447
16 Claims. (Cl. 188—24)

My invention relates broadly to brakes for driven rotary elements, but has particular reference to one which is especially applicable to a bicycle or the like, and which is preferably but not necessarily, automatically operable.

Since the conventional rear wheel-carried bicycle brake, which is operated through the sprocket chain by back pedaling, is inoperative if the chain breaks there is no reliable way to stop the vehicle, especially on a down grade. Therefore, accidents and personal injury are a frequent result of sprocket chain breakage.

Therefore, the present invention has for its primary objects to provide an emergency brake attachment for bicycles which will be automatically operable to bring the same to a stop upon breaking of the rear wheel-driving sprocket chain.

Further, the invention contemplates a device as above characterized which incorporates chain breakage-activated brake means which, while it will bring the bicycle to a prompt stop, will not do so so abruptly that the operator will be thrown forwardly over the handle bar and front wheel.

More specificially stated, the invention aims to provide a simple, durable, inexpensive, easily installed and highly efficient brake attachment for the purpose indicated, and wherein the braking element is actuated against the rear bicycle wheel with progressively increasing force following sprocket chain breakage, so as to avoid initial rear wheel locking and thus too abrupt a stop.

Invention also resides in certain novel features of construction, combination and arrangement of the various parts; and in modes of operation thereof, as will be apparent to those versed in the art.

Various other objects and advantages of my brake development will be understood and appreciated by bicycle users and manufacturers as the description proceeds, reference being had to the accompanying drawings which illustrate a now preferred form of the invention.

It should be made clear, however, that my basic inventive concept is susceptible of other mechanical expressions within the spirit and scope of the subject matter claimed hereinafter.

In the drawings wherein the same reference characters have been used to designate the same parts wherever they appear in the several views—

FIG. 1 is a fragmentary perspective taken from one side of a standard type of bicycle illustrating the application of my brake attachment thereto;

FIG. 2 is a fragmentary side elevation of the parts shown in FIG. 1, but taken from the opposite side;

FIG. 3 is a longitudinal sectional view through a piston cylinder which is incorporated in the invention and showing the piston rod locked against movement in the brake-applying direction;

FIG. 4 is a view similar to FIG. 3 but showing the piston and piston rod in the brake-applying position after the sprocket chain has broken;

FIG. 5 is a cross sectional view taken on the line 5—5 of FIG. 3 showing a piston rod-carried lug in engagement with a fixed cylinder-carried block to prevent rearward brake-applying piston rod movement prior to sprocket chain breakage;

FIG. 6 is a broken top plan view to the piston cylinder and its mounting means; the view including a portion of the forward piston rod extension and the piston rod rocking spring means for causing a gear carried by said extension to bear against the sprocket chain of FIG. 1;

FIG. 7 is a sectional view taken on the line 7—7 of FIG. 4 and showing a bleed port in the rear cylinder closure; and FIG. 8 is a sectional view taken on the line 8—8 of FIG. 4.

Referring to the drawings by reference characters and turning to FIG. 1, the front wheel, forward frame portion and rider's seat of the illustrated standard bicycle have been deleted, and only fragments of the usual seat-supporting frame members 10, 14 are shown. Thus, the drawing shows only such conventional bicycle structure as is directly related to my novel emergency brake attachment.

As illustrated in FIG. 1, the bicycle frame provides the usual lower horizontal fork having the bight portion 12 and the rearwardly extending arms 12a disposed on opposite sides of the rear wheel 18 having the pneumatic tire 18a. The rear ends of fork arms 12a have the open ended slots (not shown) through which pass the threaded ends of the rear axle 16 which latter is clamped in place by nut and washer assemblies 13, 15 as indicated.

The forward or bight end 12 of the lower horizontal fork member cooperates with the rearwardly extending frame member 10 in the support of the functionally integral bearing 28 for the shaft 26 of the pedal-driven sprocket gear 24. Shaft 26 has the conventional foot pedal-carrying crank ends 26a and the rear wheel 18 is driven by the endless sprocket chain 22 which is trained over the drive sprocket 24 and the rear wheel carried driven sprocket 20.

The hub of rear wheel 18 is provided with the usual chain operated coaster brake 17 which includes the arm 17a anchored to one of the fork arms 12a; but as will be appreciated, such brake 17, 17a is inoperative if the sprocket chain 22 breaks.

As indicated in FIGS. 1 and 2, the illustrated bicycle includes the usual so-called "kick stand" 31, 34 which includes the prop 34 and its angle-form base or mount 31. Prop 34 is swingable out and down from the FIG. 1 position to a ground-engaging position to support the bicycle in a sidewardly tilted or "parked" position when it is not in use. The base of mount 31 is plate form and is bolted (30) against the under surface of fork bight 12. The upper end of the securing bolt or bolts 30 for mount 31 are anchored in the cleat 32 which overlies the top surface of the fork bight 12 as best shown in FIG. 1.

The foregoing deals with conventional elements of a standard bicycle.

THE INVENTION INVOLVED

(The Brake Element Per Se)

Coming now to my novel automatically operable brake attachment which is generally indicated by reference character 36, same includes the piston containing cylinder 38 whose forward end is closed by the plug 40. Plug 40 is fixedly secured as at 42 and has the concentric hole 40a through which passes the reciprocatory and axially rockable piston rod 44.

FIG. 1 illustrates the reverted U-form 44, 44a, 44b of the forward end of piston rod 44 and that a rotatable element such as a sprocket gear 62, journalled as at 60 adjacent the free end of U-arm 44b engages sprocket chain 22. FIG. 1 also discloses the forward end 64 of a rear wheel opposing brake block 66 as functionally integral with the bight portion 44a of the U-end of piston rod 44.

As will be presently explained, it will be understood that so long as sprocket chain 22 remains operative brake block 66 will remain sidewardly canted and spaced away from tire 18a of wheel 18, as shown in FIG. 1.

THE MOUNTING MEANS FOR CYLINDER 38

Referring back to cylinder 38, FIGS. 3, 4, 6 and 7 show the removable rear end closure plug, which is secured as at 48, as having the rigid cleat 50 extending axially rearwardly from its back wall 46a. This cleat 50 has, adjacent its free end, the transverse slot 52 which opens from its bottom edge to receive the adjacent axle end portion 16 as will be understood from FIG. 1. Thus cylinder 38 overlies one of the rear fork arms 12a, as shown in FIG. 1, and its rear end will be firmly anchored when nut 13 is tightened to clamp the slotted portion of cleat 50 between washer 15 and the opposed end portion of fork arm 12a.

Coming now to the mounting means for the forward end of cylinder 38, and referring to FIGS. 1 and 6, it will be noted that the rear end of a forwardly extending mounting-plate 54 provides an underlying seat 54a in which is welded or otherwise secured the forward portion of cylinder 38. As indicated in FIGS. 1 and 2, the forwardly extending portion of plate 54 contiguously overlies a part of the bight portion 12 of the lower horizontal fork member and is secured thereto by a bolt 56. This bolt 56 extends through the subjacent base 31a of "kick stick" mount 31 to receive a clamp nut 56a as indicated in FIG. 2.

From the foregoing it will be clear that the brake-incorporating attachment 36 can be readily and efficiently installed by anyone.

PISTON ROD OPERATING AND CONTROL MEANS

Earlier mention has been made herein of the normal engagement of the piston rod arm-carried gear with sprocket chain 22. This gear and chain engagement is maintained (see FIG. 1) by the down pressure of the inner end 70 of the spring 68 which is coiled about piston rod 44 and has its rear end 69 bearing against the cylinder-mounting plate 54.

Means to be hereinafter described is employed to prevent rearward movement of piston rod 44 until chain 22 breaks.

FIGS. 3 and 4 show piston 76 as clamped between nuts 78, 80 and a washer 79 adjacent the inner end of rod 44 so that the piston 76 defines the forward end of a grease chamber 90 whose rear end is cylinder end closure 46.

Grease chamber 90 has communicating therewith the grease gun fitting 92 and the bleed port 94 which latter is provided by cylinder closure 46 (see FIG. 7). The normal grease level 91 in chamber 90 is preferably below the horizontal plane of bleed port 94 to avoid the possibility of leakage in hot weather, and for another important reason to be mentioned.

FIGS. 3 and 5 indicate that so long as sprocket chain 22 remains unbroken to dispose the brake block 66 in the sidewardlly canted position of FIG. 1, a fixed lug 86 on rod 44 will remain engaged with the forward end of the fixed (74) rod-guiding block 72 in cylinder 38.

However, when chain 22 breaks, the spring 68, 70 actuates the bight portion 44a of rod 44 down to engage plate 54 and align brake block 66 with the tire 18a of wheel 18. With 44a engaging plate 54, the lug 86 of rod 44 is aligned with the longitudinal block slot or groove 88 which communicates with the rod-guiding block bore 72a.

This alignment of rod lug 86 with block slot 88 is followed by rearward movement of the brake (66) carrying piston rod 44 under the action of the rod encircling coil spring 84 in the cylinder 38 which spring is interposed between the rod-guiding block 72 and the backing washer 79 of piston 76.

A primary advantage of grease-filling cylinder chamber 90 to the horizontal level of the bleed port 94 is to permit such almost immediate rearward movement of the piston 76 and its rod 44 as will bring the brake block 66 into effective braking engagement with tire 18a, but not with sufficient force to lock the wheel 18 against turning. This is important because if the rear wheel is immediately locked against turning the rider will be thrown over the handle bar and front wheel (not shown).

In most instances of chain braking, with the grease level as indicated in FIG. 3, the bicycle will be brought to a prompt safe stop before any appreciable quantity of grease is expelled through bleed port 94. This is an advantage as frequent re-supply of grease to chamber 90 will be avoided. But it will be clear that the more grease that is expelled from chamber 90, the greater will be the force of brake 66 against tire 18a.

After the bicycle has been stopped and the rider has dismounted, he will, of course, pull the brake block 66 with piston rod 44 forwardly and re-cant the block to the FIG. 1 position. Thus, re-engagement of rod lug 86 with block end 72b will be effected and needless expulsion of grease 91 from chamber 90 prevented. A cord (not shown) can be tied to brake block 66 and the adjacent end of cylinder 38 to retain block 66 in the FIG. 1 position pending repair of sprocket chain 22. Or spring end 70 can be temporarily disengaged from the rear brake block portion 64 to attain the same result.

From the foregoing it is believed that the invention, its operations and advantages will be readily understood and appreciated.

Having thus described my invention, what I claim as new and patentable is:

1. In a bicycle or the like having a frame, rear wheel and loop-form drive chain for the latter, an emergency brake for said rear wheel and peripherally opposed to the latter, bicycle frame-carried means mounting said brake element for movement to and from operative peripheral engagement with said wheel, said brake mounting means comprising a cylinder, a piston in said cylinder, a piston-carried rod rockably and slidably journalled in said cylinder and projecting from one end of the latter, said projected rod end terminating in a lateral brake-carrying arm, means normally urging said brake member to operative position against said wheel, latch means provided in part by said cylinder and in part by said piston rod and operable for maintaining the brake element in inoperative position, a drive chain-sustained end portion provided by said piston rod arm and maintaining the latch means in its operative position for so long as the drive chain remains operative, and said latch means being rendered inoperative to admit inward movement of the piston rod and brake under the action of said brake-urging means for wheel engagement by the brake upon downward rocking of the rod and its arm due to failure of said drive chain.

2. The structure set forth in claim 1, and a snubbing means for brake-operating movement of the rod and piston, said snubbing means being provided by a bleed port in a cylinder wall adjacent the end which is remote from said rod arm.

3. The structure of claim 2, and a liquid in said last mentioned cylinder end, and a normally closed filler inlet for said liquid.

4. The structure of claim 3, and wherein the latch means is wholly within said cylinder.

5. The structure of claim 2, and wherein the chain-engaging portion of said rod-provided arm is rotatable.

6. The structure of claim 1 and wherein there is yielding means normally maintaining engagement of said piston rod end with said chain.

7. The structure of claim 4, and wherein there is yielding means normally maintaining engagement of said piston rod end with said chain.

8. The combination set forth in claim 1, and said bicycle frame providing a horizontal rear fork member having a bight portion and rearwardly extending arms at opposite sides of said rear wheel, a shiftable parking prop and a carrier therefor, means securing said parking prop carrier against the under surface of the bight portion of said horizontal fork member, said brake member mounting means at least in part contiguously overlying the upper surface of the bight portion of said rear fork member and securing means for said brake member mounting means and including said prop carrier.

9. The combination set forth in claim 8, and an axle for said rear wheel and having threaded outer ends, aligned bearings provided adjacent the free ends of said fork member arms and through which said axle extends, clamp nuts on said axle ends fixedly securing said axle in said arm-provided bearings, and said brake member mounting means having an extension providing a transverse aperture through which one axle extension extends between the adjacent arm-provided bearing and the related clamp nut.

10. An automatically operable brake for a bicycle having a sprocket chain-driven rear wheel comprising in combination with the bicycle frame and one of the parallel side arms of the lower rearwardly extending rear wheel-receiving frame-provided fork, a rockable and longitudinally slidable rod member, at least one frame-carried guide member supporting said rod member in substantially parallel alignment with one of said fork arms at one side of the rear wheel, a rear wheel-opposing brake member, said rod having a lateral projection functionally integral therewith and with said brake member, said rod member projection normally supported by the bicycle drive chain to sustain it against downward rocking movement, spring means normally actuating said rod member longitudinally in a direction to actuate said brake member against the rear wheel, latch means for preventing longitudinal brake applying rod member movement, said latch means in part provided by said rod member and in part by said rod member guide member and being operative for so long as the drive chain maintains an operative drive relationship with the rear wheel so as to prevent downward rod member-rocking movement of said rod member projection, whereby breakage or sprocket disengagement of said chain results in application of the rod projection-carried brake to said rear wheel.

11. An automatically operable brake for a bicycle having a sprocket chain-driven rear wheel comprising in combination with the bicycle frame and one of the parallel side arms of the lower rearwardly extending rear wheel-receiving frame-provided fork, a rockable and longitudinally slidable rod member, at least one frame-carried guide member supporting said rod member in substantially parallel alignment with one of said fork arms at one side of the rear wheel, a rear wheel-opposing brake member, said rod member having a lateral projection functionally integral therewith and with said brake member, said rod member projection normally supported by the bicycle drive chain to sustain it against downward rocking movement, spring means normally actuating said rod member longitudinally in a direction to actuate said brake member against the rear wheel, latch means for preventing longitudinal brake applying rod member movement, said latch means comprising an outstanding lug provided by one of said rod and guide members, a lug-engaging stop portion and adjacent slot provided by the other of said members with said slot extending lengthwise of the rod member, and said lug and related stop being engaged when the brake carrying rod member projection is chain-supported so as to retain the brake inoperative, whereby when chain breakage or sprocket disengagement of same occurs to permit said rod member projection to swing downwardly, the lug will enter said slot to permit said spring to actuate the rod member to brake-applying position.

12. In a bicycle or the like having a fixed axle-carried and sprocket chain-driven rear wheel, a frame providing a horizontal fork member having a bight portion and rearwardly extending arms extending therefrom, said arms disposed at opposite sides of the rear wheel, and the rear portions of said arms having aligned hole-providing bearings through which the conventionally threaded rear axle ends extend for the application of the usual clamp nuts; the combination of an emergency brake-incorporating structure comprising a brake member for peripheral engagement with said rear wheel upon breakage of the sprocket chain, a carrier for said brake member and comprising the bight portion of the U-form forward end of a longitudinally slidable and rockably supported piston rod, the U-end of said piston rod having a free ended terminal branch, a sprocket gear journalled adjacent the free end of said terminal branch and normally engaging and supported by the sprocket chain with the brake member out of engagement with said wheel, a cylinder included as an element of a mount for said brake-incorporating structure and having a closed forward end through which said piston rod extends for both sliding and rocking movement therein, a piston on the inner end of said piston rod, said cylinder providing a grease chamber between said piston and the rear end of said cylinder, there being a bleed port and a grease gun fitting communicating with said chamber, a closure for the rear end of said cylinder, a fixed longitudinally extending cleat extending rearwardly from the rear cylinder end closure and having a transverse aperture through which one axle end extends between the adjacent fork arm and nut, whereby to fixedly secure the rear end of the cylinder to the bicycle frame; a forwardly extending mounting plate supporting and functionally integral with the forward end of said cylinder, means securing said mounting plate to the top surface of the bight portion of said frame-provided fork member, a piston rod guiding and locking block fixedly secured within said cylinder short of the forward end of the latter, said block having a piston rod-receiving bore extending therethrough and a radial longitudinally coextensive groove communicating with said bore; a laterally extending lug fixedly carried by said piston rod and slidable in said groove when the piston rod is rocked to align same therewith, said lug being disaligned with said groove and engaged with the forward end of said block to space the brake element from the wheel when said piston rod-carried sprocket gear is in engagement with the unbroken and operative sprocket chain, a coil spring surrounding said piston rod and compressed between said block and the rod-carried piston when the rod lug is in engagement with the forward block end, second spring means normally urging rocking movement of said piston rod and its U-end to cause the rod-carried sprocket gear to bear against said sprocket chain, and said cylinder-supporting mounting plate constituting a stop to engage the bight portion of the U-end of said piston rod under the action of said second spring so as to limit rocking movement of the piston rod when the chain breaks so as to align the rod lug with said block groove, whereby the rod will be actuated rearwardly against the action of the chamber grease so as to gradually apply the brake element to the rear wheel as the grease is forced out from said cylinder chamber through the bleed port of the cylinder chamber by the piston.

13. The combination set forth in claim 12, and there being an air space in said chamber above the level of grease therein, whereby to admit an initial prompt minor force engagement of the brake member with said wheel upon breakage of the sprocket chain so as to avoid locking of the rear wheel with probable attendant forward unseating of the rider.

14. In a bicycle or the like having a fixed axle-carried and sprocket chain-driven rear wheel, a frame providing a horizontal fork member having a bight portion and rearwardly extending arms extending therefrom, said arms being disposed at opposite sides of the rear wheel, and the rear portions of said arms having aligned hole-providing bearings through which the conventionally threaded rear axle ends extend for the application of the usual clamp nuts; the combination of an emergency brake-incorporating structure comprising a brake member for peripheral engagement with said rear wheel upon breakage of the sprocket chain, a carrier for said brake member and comprising the bight portion of the U-form forward end of a longitudinally slidable and rockably supported piston rod, the U-end of said piston rod having a free ended terminal branch, a sprocket gear journalled adjacent the free end of said terminal branch and normally engaging and supported by the sprocket chain with the brake member out of engagement with said wheel, a dashpot-incorporating mount for said piston rod and including a piston secured to the latter, said mount carried by said fork member and having a portion overlying one of its arms, a means constantly urging said brake member to operative wheel-engaging position against the retarding action of said mount-provided dashpot, and releasable latch means retaining said brake member in its inoperative position.

15. The combination set forth in claim 14, and said latch means in part provided by each of said piston rod and mount and released by downward movement of said sprocket gear following breaking of said sprocket chain.

16. The combination set forth in claim 15, and downwardly acting means normally urging said sprocket gear toward said sprocket chain.

References Cited in the file of this patent

UNITED STATES PATENTS

| | | |
|---|---|---|
| 639,408 | La Burt | Dec. 19, 1899 |
| 697,707 | Eaton et al. | Apr. 15, 1902 |
| 833,067 | Ling | Oct. 9, 1906 |
| 2,971,613 | Larkin et al. | Feb. 14, 1961 |